United States Patent [19]

Shprecher et al.

[11] Patent Number: 5,042,431
[45] Date of Patent: Aug. 27, 1991

[54] MULTIPLE BOILER CONTROL SYSTEM AND METHOD OF OPERATION

[75] Inventors: Daniel Shprecher, Highland Lake; Jana Marakowitz, Paterson; David Sandelman, Secaucus, all of N.J.

[73] Assignee: Heat Timer Corporation, Fairfield, N.J.

[21] Appl. No.: 508,125

[22] Filed: Apr. 9, 1990

[51] Int. Cl.⁵ .................. F22B 37/42; F22D 5/00
[52] U.S. Cl. .................. 122/448.3; 236/1 EB; 237/8 R
[58] Field of Search ........ 236/1 EB, 15 BG, 14; 122/448.3; 237/8 A, 8 R

[56] References Cited

U.S. PATENT DOCUMENTS

| | | | |
|---|---|---|---|
| 4,542,849 | 9/1985 | Pichot et al. | 236/1 EB |
| 4,598,668 | 7/1986 | Bader | 122/448.3 |
| 4,860,696 | 8/1989 | Fudita | 122/448.3 |

Primary Examiner—William E. Wayner
Attorney, Agent, or Firm—Darby & Darby

[57] ABSTRACT

A multiple-boiler heating system is disclosed in which each boiler or stage is provided with an adjustable firing level of modulation at which the boiler is turned on and an adjustable threshold level of modulation (the MOD point), below which the next stage is disabled from being turned on. A control device for the heating system continuously compares temperature in the area being heated to the set point for the system and determines the total change in system output level ("DUTY-CHANGE") which would be required to produce a specified temperature within a predetermined time. Should DUTYCHANGE be negative, it is similarly distributed among the stages which are turned on. However, the reduction in modulation level proceeds backwards from the last stage which was turned on. When the last stage reaches its firing point, it is not turned off until the previous stage drops below its MOD point. The lead stage is turned off as soon as it reaches its firing point.

20 Claims, 6 Drawing Sheets

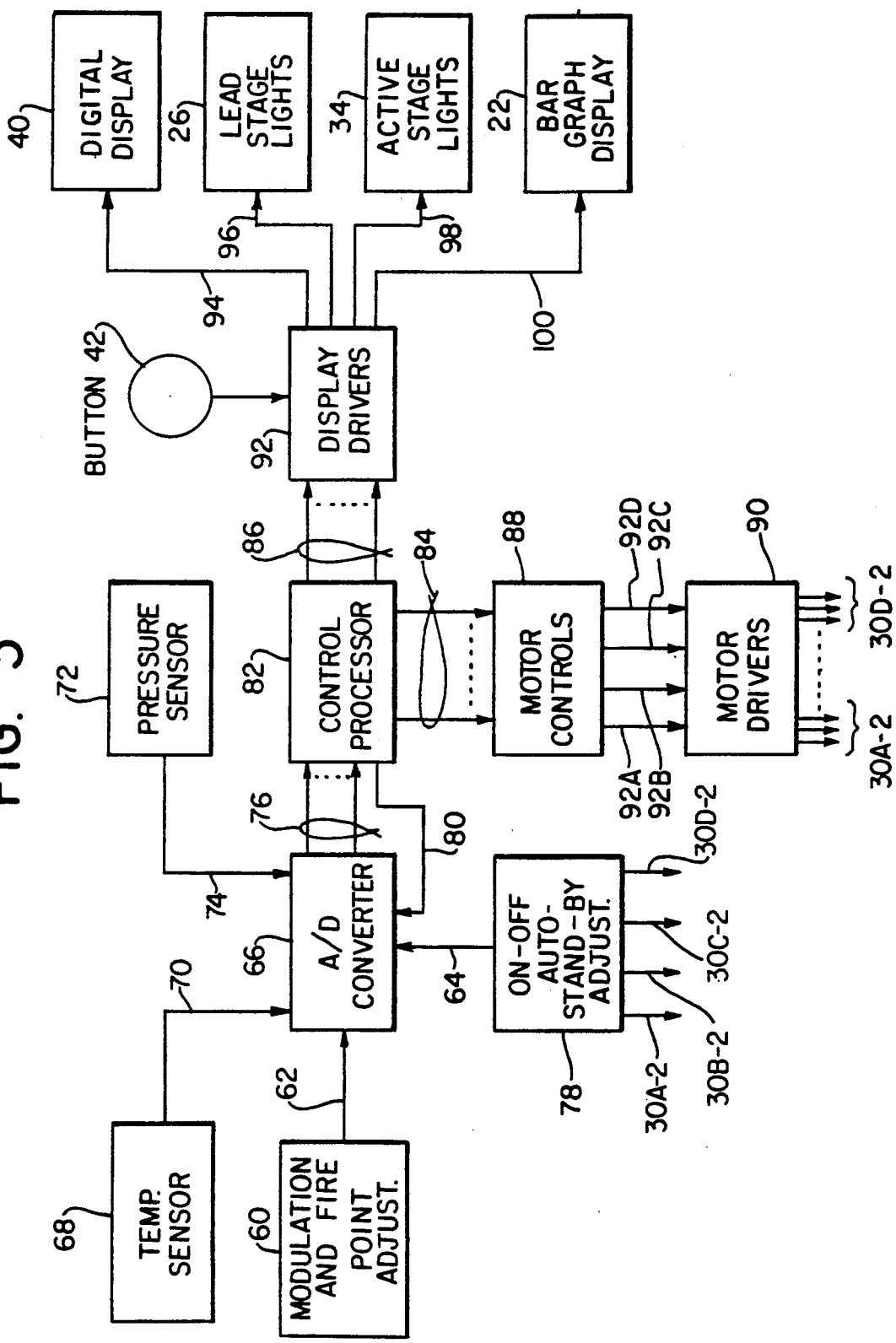

MULTIPLE BOILER CONTROL SYSTEM AND METHOD OF OPERATION

FIELD OF THE INVENTION

The present invention relates generally to multiple boiler systems utilized for buildings and, more particularly, concerns such a heating system, and a method for operating the same, which system utilizes multiple boilers which are controlled so as to share the heating load in accordance with the heat required to maintain the temperature of the building, or any other consumer of steam or hot water (e.g., kitchens, steam absorbtion chillers or industrial processors) at a selected level.

BACKGROUND OF THE INVENTION

With dwindling supplies and increasing costs of energy, its efficient utilization and efficiency of operation of heating systems has become and will remain a major priority. This, in turn, is reflected as a need for highly efficient boilers and highly efficient systems and methods for their utilization. In this regard, it is now known that it is not efficient to utilize a single, large boiler for large areas, such as commercial buildings, in regions of the country where substantial fluctuation in temperature can be expected, such as in the northeast. The reason is that such boilers exhibit a relatively high stand-by loss, which is incurred during the entire time that the boiler is in operation. Moreover, a boiler would typically operate at 10–60% of system load for approximately 85% of the operating time of the equipment. Thus, even a boiler with a stand-by loss which is a relatively low percentage of the maximum load would have a relatively high stand-by loss as a percentage of the actual operating level of the system.

In an effort to reduce stand-by loss, boiler plants have been designed to utilize multiple smaller boilers in place of one large boiler, with additional boilers being switched into operation as the load (i.e. outdoor temperature) and, therefore, the required heat output increases. The stand-by loss for each of the smaller boilers will typically be substantially smaller than that of one large boiler and, since most of the boilers will be turned off a high percentage of the time, the overall stand-by loss is substantially reduced.

Although a large number of small boilers operating in an on/off fashion results in a substantial reduction in standby loss, this is not an entirely efficient mode of operation. High efficiency boilers operate far more efficiently at levels in the range of 50% to 80% of their full output, than they do at full output. Accordingly, on-off operation does not make for more sufficient use of such boilers. It has therefore been suggested that, rather than operating a large number of boilers in on-off fashion, a relatively small number of boilers (e.g. two to four boilers) be operated so that each exhibits a plurality of discrete modulation levels between fully on and fully off. In a typical system of this type, each boiler is turned on at a predetermined firing level of modulation and progresses through a sequence of increasing levels until a predetermined threshold level is reached, at which time the subsequent stage is turned on at its firing level. In order to achieve increased efficiency, a subsequent stage may be modulated up towards its threshold level, before the previous stage is modulated substantially beyond the threshold level, since higher levels of modulation can be expected to be substantially less efficient. When heating demand decreases, the modulation level of the last turned-on boiler is progressively decreased with decreasing demand, until it is turned off. Then, modulation of the previous boiler is progressively reduced, and so forth.

Systems of this type achieve a substantial improvement in efficiently of operation, but they are far from optimum. In an optimum system, each boiler would preferably operate at a continuum of levels between its firing level and full modulation. In addition, efficiency is maximized by operating all of the boilers at their modulation level of highest efficiency for the maximum amount of time. It is therefore preferable to distribute the heating load as equally as possible among all of the boilers. In addition, substantial inefficiency results from the constant on-off cycling of the last boiler, which is turned on, so it is desirable that such cycling be eliminated.

Broadly, it is an object of the present invention to provide a multiple boiler heating system which avoids the shortcomings of known systems. It is specifically contemplated that the inefficiencies of prior systems be avoided and that operation close to optimum be achieved.

It is another object of the present invention to avoid the stand-by loss associated with the use of a single large boiler in a heating system.

It is yet another object of the present invention to avoid the inefficiencies that result from operating multiple boilers in a heating system in an on-off mode of operation.

It is yet another object of the present invention to operate a multiple-boiler system so that all the boilers which are on at the same time operate at their highest level of efficiency.

It is yet another object of the present invention to prevent repeated on-off cycling of the last turned on boiler in a multiple-boiler heating system.

It is also an object of the present invention to provide a multiple-boiler heating system and a method for operating the same which result in a high level of efficiency in utilizing fuel, a high level of reliability, and a relatively low cost.

In accordance with an illustrative embodiment demonstrating objects and features of the present invention, each boiler or stage in a multiple-boiler system is provided with an adjustable firing level of modulation at which the boiler is turned on and an adjustable threshold level of modulation (the MOD point), below which the next stage is disabled from being turned on. A control device for the system continuously compares temperature in the medium being heated to the set point for the system and determines the total change in system output level ("DUTYCHANGE") which would be required to produce a specified temperature within a predetermined time. If DUTYCHANGE is positive, it is distributed as equally as possible among successive stages, which are turned on as needed. Should DUTYCHANGE be negative, it is similarly distributed among the stages which are turned on. However, the reduction in modulation level proceeds backwards from the last stage which was turned on. When the last stage reaches its firing point, it is not turned off until the previous stage drops below its MOD point. The lead stage is turned off as soon as it reaches its firing point.

BRIEF DESCRIPTION OF THE DRAWINGS

The foregoing brief description, as well as further objects, features, and advantages of the present invention will be understood more completely from the following detailed description of a presently preferred, but none the less illustrative, embodiment, with reference being had to the accompanying drawings in which:

FIG. 3 is a functional block diagram illustrating the construction and operation of the control system utilizing the control panels of FIGS. 1 and 2;

DETAILED DESCRIPTION OF THE PREFERRED EMBODIMENT

Figure 1:
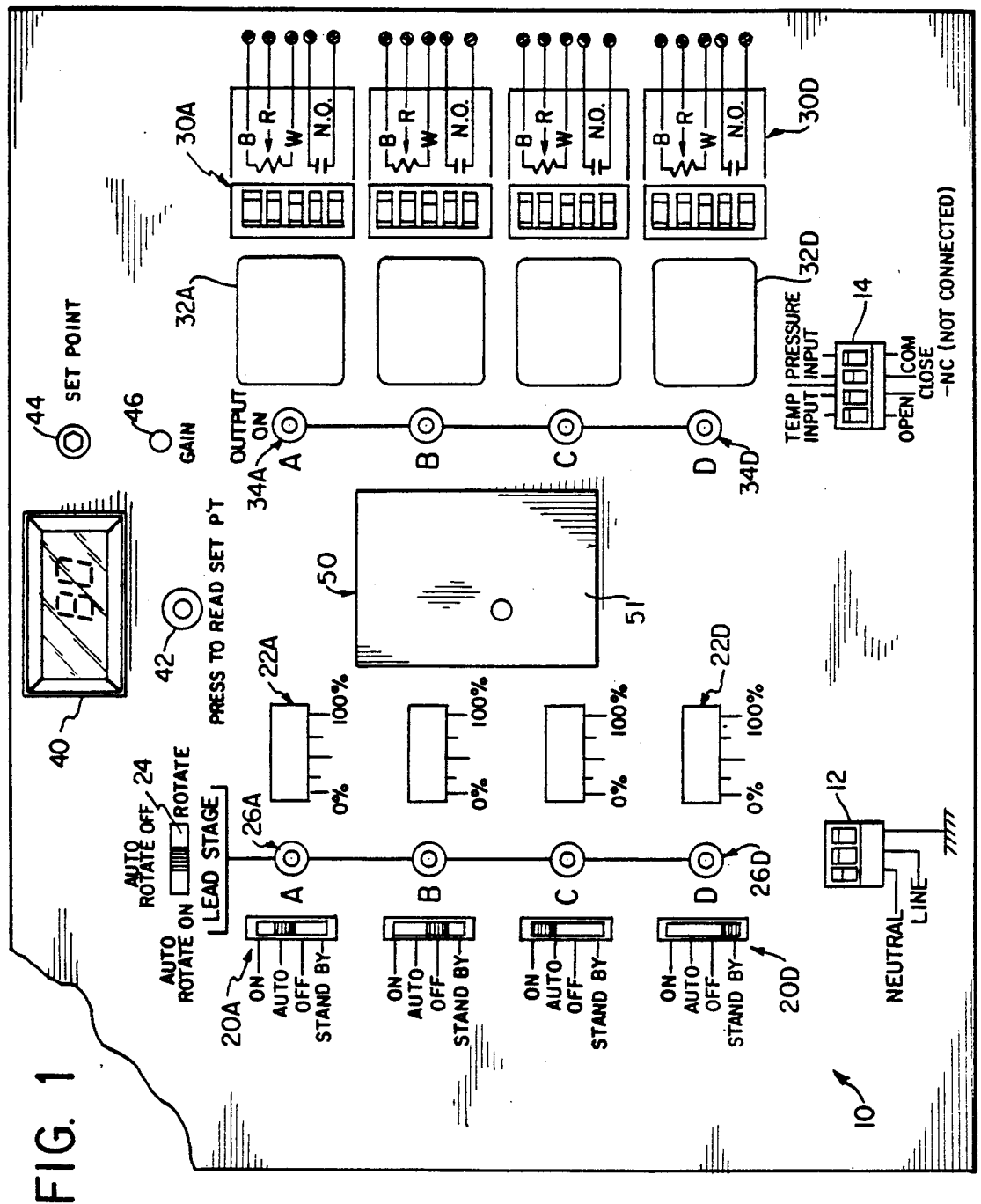
FIG. 1 illustrates a control panel for a multiple-boiler system constituting the presently preferred embodiment of the invention.

FIG. 1 illustrates the control panel 10 of a multiple boiler system incorporating objects and features of the present invention and represents the presently preferred embodiment thereof.

The control panel 10 receives power via the terminals 12, and the outputs of temperature or pressure sensors are applied as inputs via the terminals 14. The preferred system has four boilers (not shown), which will hereafter be represented by the referenced characters A, B, C, and D, and any component corresponding to a particular boiler will be identified by using the reference character for that boiler as a suffix for the reference character of the component. For example, each of the four positions slide switches 20A, 20B, 20C, and 20D corresponds to one of the boilers and determines the mode of operation of the respective boiler. The four positions of the slide switches are defined as "on", "auto", "off", and "standby." When one of these switches is in the "on" or "off" position, the corresponding boiler is either fully on or fully off, respectively. With a switch in the "auto" position, the corresponding boiler is operated so that the percentage modulation (the percentage of operation or firing of the corresponding boiler as compared to being fully on) is determined under microprocessor control. With the switch in the "standby" position, operation is similar to "auto", except that automatic operation is preceded by a predefined delay period, during which the corresponding boiler is fully off. During operation, the percentage modulation of each boiler is displayed on a corresponding one of the bar graph displays 22A, 22B, 22C, and 22D.

A three position slide switch 24 permits selection of the primary boiler or "lead stage." The lead stage is the one that is turned on first and, accordingly, would be expected to be on any time heat is called for. With switch 24 the "auto rotate on" position, the lead stage is rotated automatically under process control every 24 hours. With switch 24 in the "auto rotate off" position, the lead stage is not changed. Each time switch 24 is brought to the "rotate" position, the system advances a new stage to the lead stage. To select a particular stage as the lead stage, switch 24 is shuttled back and forth between the "off" position and the "rotate" position, until the desired stage is the lead stage, selecting the desired stage permanently as the lead stage. Alternatively, switch 24 may be brought to the "auto rotate on" position, in which case rotation begins with the selected stage. The display elements 26A, 26B, 26C, and 26D, preferably light emitting diodes (LEDs), are operated so that one of the LEDs is illuminated when the corresponding stage is the lead stage, thereby indicating to the operator which stage is the lead stage.

The preferred embodiment of the invention is intended for use with systems in which boilers are modulated by means of servomotors, each servomotor is controlled by means of a three-terminal output. Such control is disclosed, for example, in the publication Automatic Control Principles, published by Honeywell of Minneapolis, Minn., under publication No. 71-97152 (see pages 32–35 and FIG. 63 on page 52). Control of such a servomotor system is also disclosed in U.S. Pat. No. 4,755,730, issued to the assignee of the present application on July 5, 1988. Four multi-terminal output ports 30A, 30B, 30C, and 30D appear on the right-hand side of the panel 10. Each of these output ports includes five terminals. The upper three terminals (labelled B, R, and W) are utilized to control a respective servomotor in the manner illustrated in U.S. Pat. No. 4,755,730. The lower two terminals in each port are connected to a respective relay (labelled 32A, 32B, 32C, and 32D, respectively), and each of these relays turns the corresponding boiler on and off through those lower two terminals of the port.

Panels 10 also includes light emitting diodes 34A, 34B, 34C, and 34D, which are illuminated when the corresponding stage is active.

A digital display 40 on the control panel constantly displays the sensed temperature or pressure. When the pushbutton 42 is pressed, the display 40 will read the set point of the system. By operating further controls behind an access panel 51 in a compartment 50 (discussed in further detail below) additional operating parameters may be set. It is possible to adjust the set point by means of a knob 44. In addition, if the pushbutton 42 is pressed a second time, display 40 displays a gain factor of the system, and it is possible to set the gain factor by turning an adjustment screw 46.

Figure 2:
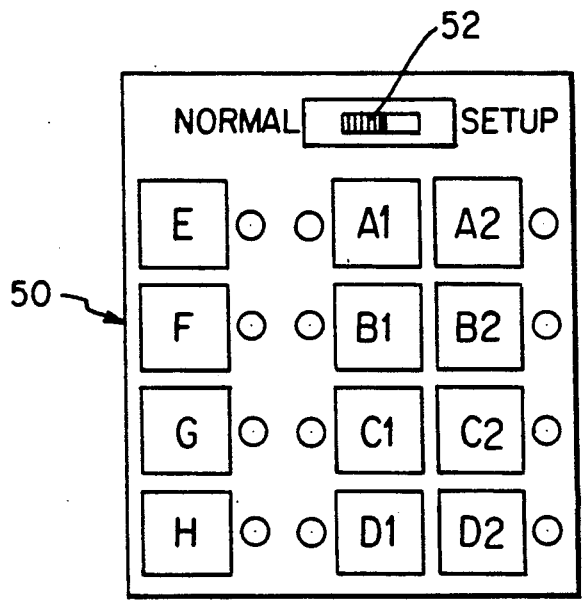
FIG. 2 illustrates the controls appearing inside an access panel on the control panel of FIG. 1.

The controls appearing inside access panel 50 are illustrated in FIG. 2. In order to make adjustments, a slide switch 52 is moved to the "setup" position, and after all adjustments are completed, it is moved to the "normal" position. When trimmer potentiometers, A1, B1, C1, or D1 are adjusted, the ignition points of the corresponding stages are adjusted. Similarly, when trimmer potentiometers A2, B2, C2, or D2 are pressed, the start of modulation threshold point for enabling the stage after the corresponding stage is set. When pushbutton 42 is pressed repeatedly, LEDs alongside the trimmer potentiometers are lit in turn, and the setting of the corresponding trimmer potentiometer may then be read on display 40. Similarly, potentiometer E permits setting the short-cycling delay in minutes, potentiometer G allows for setback of the setpoint temperature or pressure, and potentiometer H permits adjustments of the standby time in minutes.

FIG. 3 is a functional block diagram illustrating the construction and operation of a boiler control system utilizing the control panel of FIGS. 1 and 2.

A modulation and fire point adjustment assembly 60 incorporates the functions of set point knob 44, gain adjustment screw 46, and the control elements in the compartment 50 behind access panel 51 (see FIG. 2). Operating these elements produces an analog signals on different leads of line 62 (each lead is dedicated to one of the signals), each of which represents the magnitude of one of the desired operating points. For example, adjusting potentiometer A1 in FIG. 2 permits adjustment of the percentage modulation for ignition of stage A. This adjustment produces an analog signal on one of leads of line 62 representing the percentage modulation at which stage A will be fired.

Block 66 represents a multiple input analog-to-digital converter. A number of these inputs are the analog signals on line 62. In addition, a signal produced by a temperature sensor 68 in the area being heated is coupled to converter 66 via lead 70. If the system were a steam system, a pressure sensor 72 would be coupled to the converter 66 via lead 74. It will be appreciated that the temperature or pressure sensor is connected to the control panel in FIG. 1 at terminals 14. In addition, an analog signal representing the position of each of switches 20A, 20B, 20C, and 20D is provided on one of a plurality of leads comprising line 64. Also, converter 66 receives a control signal via line 80. In operation, each analog signal applied to converter 66 is converted to digital form, on an ongoing basis, and is stored in a register within the converter which is dedicated to that input. The signal on line 80 permits the selection of a particular register and presentation of its contents on leads 76. A multiple input A/D converter of this type which preferred for this application is the one available from RCA Corporation under the designation CDP68HC68AZ.

On-off-auto-standby adjustment assembly 78 includes switches 20A, 20B, 20C, and 20D of FIG. 1, as well as the relays 32A, 32B, 32C, and 32D. It also includes the slide switch 24, and the two lower terminals of each of ports 30A, 30B, 30C, and 30D are presented as the output leads 30A-2, 30B-2, 30C-2, and 30D-2. In operation, when one of switches 20A, 20B, 20C, and 20D is in the on, auto, or standby state, a signal is applied at the respective output lead, which causes the corresponding stage to be turned on. On the other hand, if a switch for a stage is in the off position, a signal is applied at the corresponding output lead which turns that stage off.

At the heart of the boiler control system is a control processor 82, which preferably includes a preprogrammed microprocessor and random access memory (RAM). The program for the control process will be discussed in some detail below. Control processor 82 addresses A/D converter 66 via line 80 to select the parameter value to be read, and it receives a signal representing this parameter via leads 76, to produce, on leads 84, digital signals representing the modulation of each of the stages which is in the auto or standby state, and it produces on leads 86 digital signals representing the various displays. In operation, a parameter, such as a stage and specific set point are specified on lines 64, and the value of that parameter appears in digital form on leads 76. Processor 82 utilizes all of this information in performing the various operations discussed further below in generating the output signals on leads 84 and 86.

Motor controls 88 and motor drives 90 are preferably of the type disclosed in U.S. Pat. No. 4,755,730. That is, box 88 includes 4 controllers and box 90 includes 4 motor drivers, each corresponding to one of those controllers. Each of lines 92A, 92B, 92C and 92D represents a pair of leads corresponding to a respective stage. The leads corresponding to each of these lines each include a pair of complementary square wave signals, in which the duty cycle is related to the modulation for the corresponding stage. These complementary signals, in turn, control one of the motor drivers 90. Each motor driver includes three output terminals (B, R, W) represented by the groups of three leads 30A-2 through 30D-2. In each of these groups of three terminals, the impedance between the middle terminal and the two outside terminals varies in relationship of the signals applied to the corresponding motor drive. This time-varying impedance is applied to a control circuit for a motor for the corresponding stage, to achieve modulation of that stage.

The digital signals on leads 86 are applied to conventional display drivers 92, in order to achieve the digital display 40 and the four bar graphs displays 22A, 22B, 22C, and 22D, represented collectively as bar graph displays 22. As previously explained, digital display 40 can be advanced progressively to display different data by repeatedly depressing pushbutton 42. Digital display 40 may be a conventional LED display, in which case, the display drivers in box 22 which are coupled to digital display 40 via multilead line 94 would be a conventional seven-segment display drivers. The remaining displays 22, 26, and 34 may be LED displays, in which case the drivers in box 92, which are coupled to those displays via lines 96, 98, and 100, respectively, are conventional LED drivers.

A primary function controlled by processor 82 is the automatic modulation of the four boilers, in order to meet the load demands imposed upon the system. Prior to such automatic operation, a firing point and threshold modulation point for enabling modulation of the subsequent stage (hereafter referred to as the MOD point) would have been provided to the processor for each stage operating automatically, as already described. During automatic operation, processor 82 continually determines the total change in output level of the boilers which would be required to produce a specified temperature within a predetermined time. This quantity will be referred to as "DUTYCHANGE."

If DUTYCHANGE is positive, it is added to the lead stage, until that stage reaches its MOD point. Thereafter the DUTYCHANGE is added equally to the lead stage and the second stage, until the firing point of the second stage is reached or the lead stage reaches a 100%. This sharing of DUTYCHANGE among successive stages continues until the entire DUTYCHANGE requirement is met.

Should DUTYCHANGE be negative (i.e. a decrease in temperature) processor 82 begins with the last stage which is active and works backwards. In this case, DUTYCHANGE is subtracted from the last stage until it reaches its firing point, at which point any remaining DUTYCHANGE is subtracted from the preceding stage, until the preceding stage drops below its MOD point. At that time, the last stage is turned off. This reverse operation continues until the amount of decrease in DUTYCHANGE is achieved. The lead stage is turned off as soon as it reaches its firing point.

Figure 4:
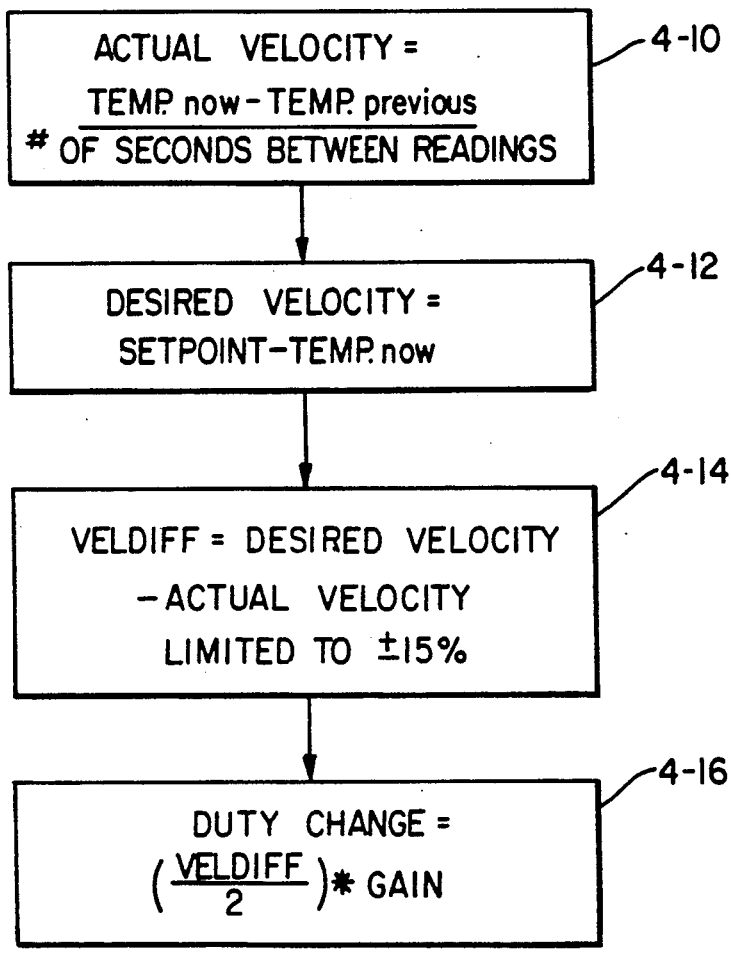
FIG. 4 is a flow chart illustrating the computation of DUTYCHANGE during the operation of the control system of FIG. 3.

FIG. 4, provides a flow chart for the subroutine PID, which computes DUTYCHANGE, the total change in modulation over all stages in order for the set point to be reached in one minute. This subroutine would be repeated on a scheduled basis. It will be appreciated that, if the system being controlled is changing the temperature at such a rate that the set point would be reached in exactly one minute, no change would be made to the settings of the various stages. However, if the set point would be reached before one minute, the various modulation settings would cause the system to overshoot the set point, and adjustments must be made to the settings of the stages in order to avoid this. Similarly, if the stages are presently set so that the system would not reach the set point within one minute, the levels at which the various stages are adjusted must be increased. This increase is, however, limited to a nominal maximum value so as to avoid repetitive overshoots and hunting about the desired value. This maximum change at any one time is adjusted by operating gain control screw 46 (see FIG. 1).

Referring now to FIG. 4, there is illustrated a flow chart for the subroutine PID. At block 4-10, the actual rate of change of temperature (referred to as temperature velocity for convenience) is determined as the change in temperature between two consecutive samples, divided by the number of seconds between readings, where $Temp_{now}$ is the current temperature and $Temp_{previous}$ is a previous temperature. At, step 4-12, the desired temperature velocity is determined as the desired temperature change, in order to reach the set point in one minute. This is, of course, equal to the difference between the set point and $Temp_{now}$ divided by one. At step 4-14, the velocity difference Veldiff, is computed as the difference between the desired velocity and the actual velocity. This number, is, however, limited to an absolute maximum of plus or minus 15%, for the reasons explained above.

At step 4-16, DUTYCHANGE is determined as half of Veldiff times the gain as set by adjustment screw 46. As explained above, this value of DUTYCHANGE will be used in adjusting the operating levels of the various stages which are operating automatically or in standby mode.

The subroutine which computes the adjustment of the various stages is called "STAGE." The purpose of this subroutine is to effect the adjustment indicated by DUTYCHANGE, by controlling stages which are either in the AUTO or STANDBY mode.

Figure 5:
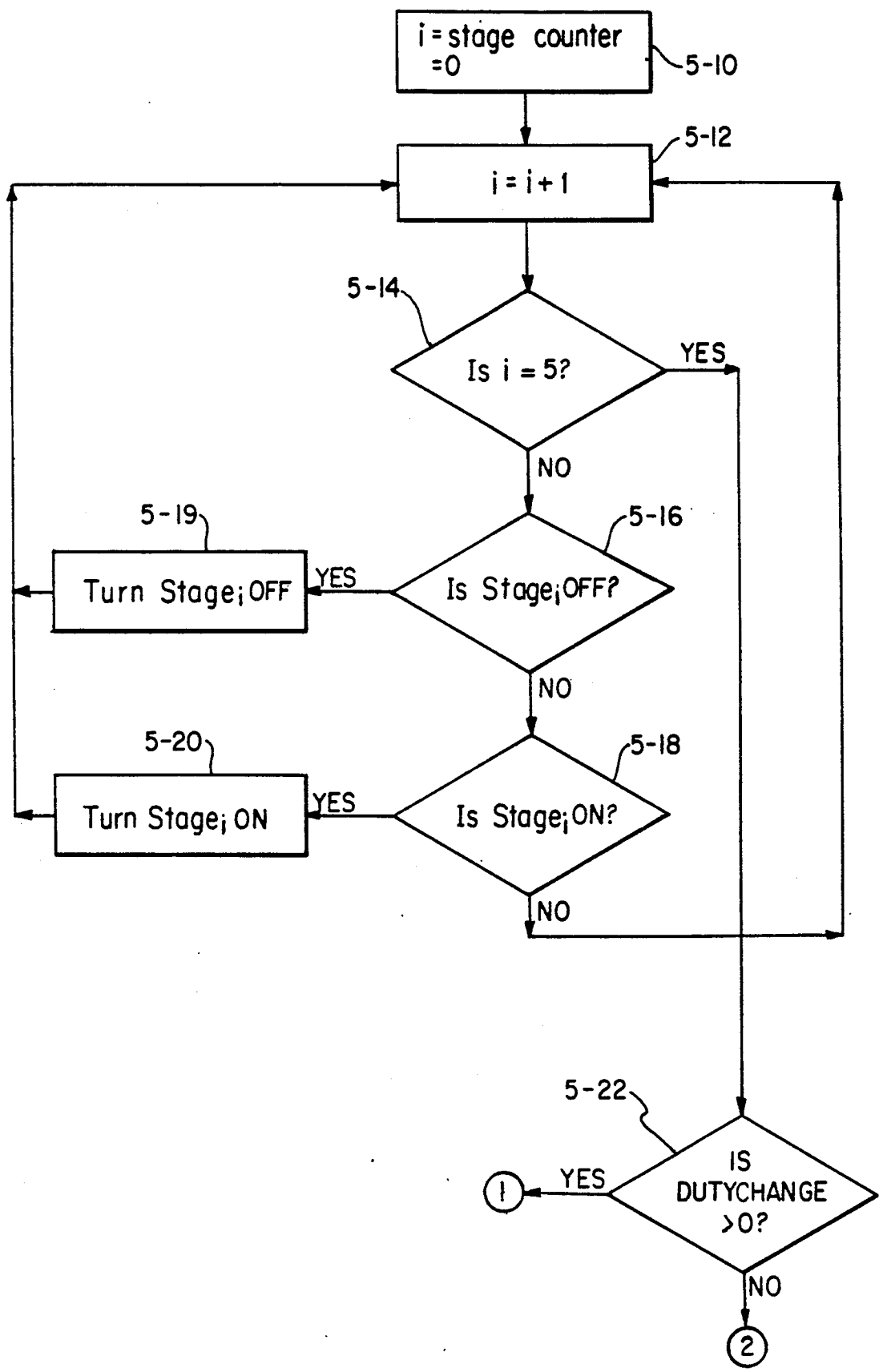
FIG. 5 illustrates the process utilized by the control system of FIG. 3 to sense the position of the various switches utilized to operate and adjust the control system.

A preliminary phase of the subroutine, STAGE-PRELIMINARY, therefore scans the switches 20A, 20B, 20C, and 20D to determine their states, and it records these states in memory. This preliminary routine is illustrated in the flow chart of FIG. 5. In this routine, an index variable i, is used to represent the stage which is being interrogated. At step 5-10, this variable is set to zero. Thereafter, a processing loop is initiated at step 5-12 by incrementing i by one. At step 5-14, a test is performed to determine whether or not i is equal to five. If it is, then all four stages have been interrogated and processing proceeds to step 5-22 (discussed below). If i is not equal to five, a test is performed at step 5-16 to determine whether or not the switch 20 corresponding to the present stage, stage i, is in the OFF position. If it is, step 5-19 is performed, at which processor 82 records in its memory that stage i is in the OFF state and turns it off. If the switch corresponding to stage i is not in the OFF position, a test is performed at step 5-18 to determine whether or not the switch is in the ON position. If it is, step 5-20 is performed, at which processor 82 records in its memory that stage i is in the ON position and turns the stage on. If the corresponding switch is not in the ON position, then processing returns to step 5-12, at which the interrogation of the next stage begins.

Subroutine STAGE-PRELIMINARY must end with a branch to step 5-22. At this step, a test is made to determine whether or not DUTYCHANGE is greater than zero. If it is, a transfer is made to branch point 1 and if it is not, a transfer is made to branch point 2.

The subroutine STAGE, includes two additional subsections, corresponding respectively to branch point 1 and branch point 2. That is, if DUTYCHANGE is positive, operation branches to branch point 1, and this subsection will therefore be called STAGE-POSITIVE. On the other hand, if DUTYCHANGE is less than or equal to zero, a branch is made to branch point 2. For convenience, this latter subsection of the subroutine STAGE will be called STAGE-NEGATIVE.

Figure 6:
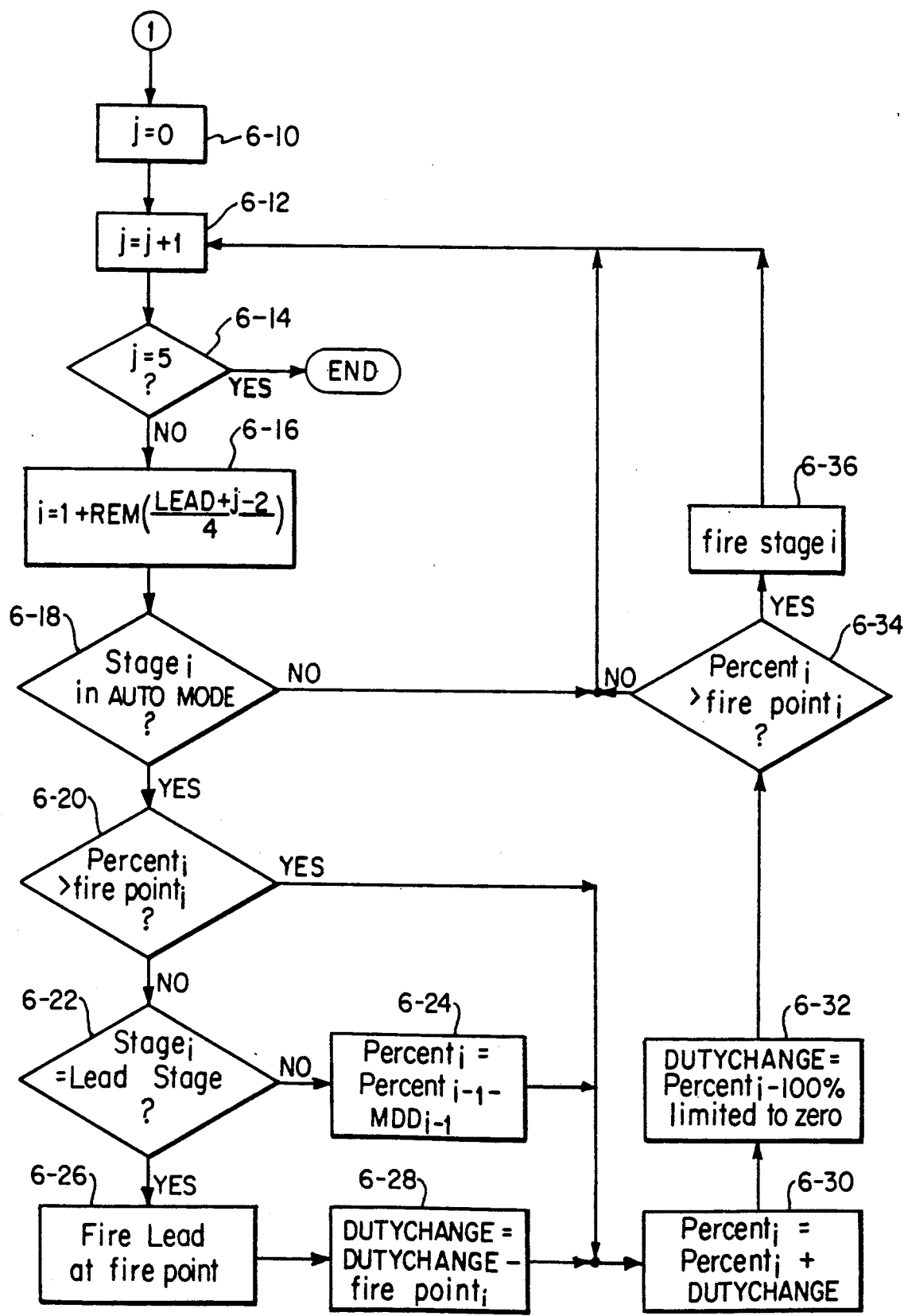
FIG. 6 is a flow chart illustrating the process performed by the control system in adjusting the boilers for a positive value of DUTYCHANGE.

The flow chart of FIG. 6 represents the subroutine STAGE-POSITIVE. This subroutine utilizes two stage-counting index variables, j and i. The variable j is utilized to count the number of stages that have been processed, in order to assure that every stage is handled. In fact, the subroutine STAGE-POSITIVE will end after every stage has been handled. At step 6-10, the index variable j is initiated at zero. At step 6-12, j is incremented by one, in order to test the first of four stages. At step 6-14, a test is made to determine whether or not j is equal to five. If it is, all stages have been tested and subroutine STAGE ends. The index variable i addresses the actual stage being processed by its assigned number (it will be assumed that the stages are simply assigned the numbers 1 through 4). If j is not equal to five at step 6-14, processing proceeds to step 6-16, where the index variable i is set equal to one greater than the remainder (abbreviated REM) of (LEAD+j−2)/4, where the variable LEAD is equal to the number of the lead stage. This calculation assures that LEAD will always be the first stage processed. At step 6-18, a test is performed to determine whether stage i is in the AUTO mode. If not, processing returns to step 6-12, and steps 6-12 through 6-18 are repeated for the next value of j. The stages are then treated as if connected in a ring; with processing continuing with the stage after LEAD, followed by each subsequent stage, in turn. Inasmuch as a stage which is in STANDBY mode and has timed out is essentially in the AUTO mode, it will be appreciated that step 6-18 must also test for stages in the STANDBY mode which have timed out, although this is not specially stated in the flow chart.

If it is determined at step 6-18 that the present stage, i, is in the AUTO mode, a test is performed to establish whether this stage has been turned on yet. This is achieved at step 6-20 by determining whether or not $Percent_i$ is greater than the firing point of this stage, where $Percent_i$ is the current modulation of the present stage. If the present stage has been turned on, processing jumps immediately to step 6-30. Otherwise, processing continues with step 6-22, where it is determined whether or not the present stage is the LEAD stage.

If the present stage is not the LEAD stage, processing continues with step 6-24, at which the percent modulation of the present stage is set equal to the difference between the percent modulation and MOD point of the previous stage. It will be recalled that $MOD_{i-1}$ is the prescribed threshold modulation for the previous stage at which the present stage will begin to be modulated. Hence, at step 6-24, the modulation of the present stage is set equal to the excess of the modulation of the previous stage over this threshold level, and processing continues at step 6-30.

If the present stage is the LEAD stage, processing goes from step 6-22 to step 6-26, at which the present stage is fired. Thereafter, DUTYCHANGE is decremented by the firing point of the present stage, at step 6-28, and processing continues at step 6-30.

It will be appreciated that there are three ways to arrive at step 6-30. First of all, it could have been determined at 6-20 that the present stage has already been turned on. Secondly, it could have been determined at step 6-22 that this is not the lead stage, in which event, the percentage modulation of the present stage would have been set equal to the excess of the previous stage over its MOD point, without firing the present stage, and without decreasing DUTYCHANGE. If the present stage is the LEAD stage, it would have been fired at step 6-26, and DUTYCHANGE would have been decremented by the fire point.

At step 6-30, the percent modulation of the present stage is incremented by DUTYCHANGE, and at step 6-32 DUTYCHANGE is set equal to the excess of the new percentage modulation of the present stage over 100% with DUTYCHANGE being limited to zero if it would assume a negative value. Thus, the percentage modulation of the present stage is incremented by DUTYCHANGE, and DUTYCHANGE is reduced to zero, so long as this percentage modulation would not have to exceed 100%. If the percentage modulation would have to exceed 100%, it is simply increased to 100%, and that portion of DUTYCHANGE which would raise the percentage modulation over 100% is restored to DUTYCHANGE, so as to be absorbed by the next stage. At step 6-34, it is determined whether the new percentage modulation of the present stage exceeds the fire point (i.e. whether or not the present stage should now be turned on). If this is so, the present stage is fired at step 6-36, and operation returns to step 6-12 for processing of the next stage. On the other hand, if is determined at step 6-34 that the present stage should not be turned on, then processing simply returns to step 6-12.

Figure 7:
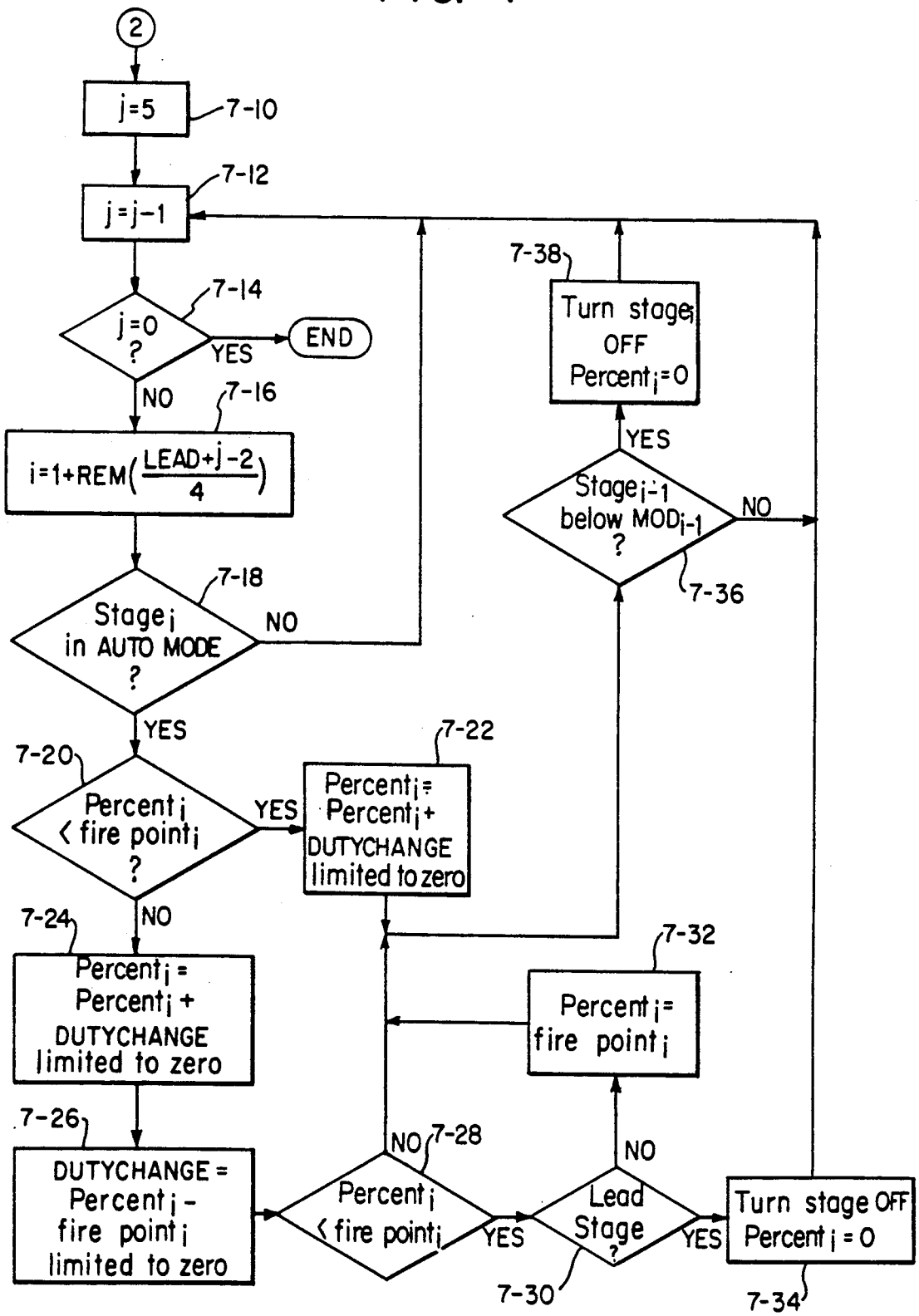
FIG. 7 is a flow chart illustrating the process utilized by the control system to adjust the boilers for a negative value of DUTYCHANGE.

The subroutine STAGE-NEGATIVE is represented in flow chart form in FIG. 7. Steps 7-10 through 7-18 of this flow chart are substantially identical to steps 6-10 through 6-18 of FIG. 6, except that the index j is initiated at 5 and is decremented, instead of being incremented. The effect of this reverse counting is that processing begins with the last stage and works backwards to the lead stage. The subroutine STAGE-NEGATIVE terminates when all four stages have been processed.

In the discussion which follows, it should be kept in mind that DUTYCHANGE is a negative quantity. At step 7-20, it is determined whether the present stage is below its fire point. If this stage is below its fire point, the percentage modulation of this stage is, nevertheless, reduced by DUTYCHANGE at step 7-22, but the percentage modulation is limited to zero (i.e. no negative percentages). Processing then continues at step 7-36. If it is determined at step 7-20 that the modulation of the present stage is not below its fire point, at step 7-24 percentage modulation for the present stage is reduced by DUTYCHANGE, limited to zero. At step 7-26, DUTYCHANGE is then set equal to the excess of the percentage of modulation over the fire point, limited to zero (negative values), so that this will be passed on as an adjustment to the next (preceding) stage. At step 7-28, a test is performed to determine whether the present stage is below its fire point and, if it is not, control is passed to step 7-36.

If it is determined at step 7-28 that the percentage modulation for stage i is now below its fire point, a test is performed at step 7-30 to determine whether or not this is the lead stage. If it is not the lead stage, the percentage modulation is set equal to the fire point, and control is transferred to step 7-36. If it is determined at step 7-30 that this is the lead stage, the stage is turned off at step 7-34 and the percentage modulation is set to zero. Control then transfers to step 7-12, and the subroutine terminates through the test at step 7-14.

The subroutine arrives at step 7-36 through any of a number of routes. Regardless of the route, $Percent_i$ would have received a new value by this point. In addition, if the percent modulation of the present stage was not below the fire point, DUTYCHANGE would also have received a new value. At step 7-36, it is determined whether the previous stage (the next one to be processed in this subroutine) is below its MOD point. If not, control returns to step 7-12 for processing of this stage. If it is determined at step 7-36 that the previous stage is below its MOD point, then the present stage is turned off and its percent modulation is set equal to zero (step 7-38). Control then is transferred to step 7-12 for processing of the previous stage.

From the foregoing description, it will be appreciated that the subroutine PID is performed on an ongoing basis, so as to continuously generate new requirements for DUTYCHANGE. Preferably, the subroutine STAGE is performed on a periodic basis. From the description of subroutine STAGE, it will be appreciated that, when additional heat is being demanded by the system, subroutine STAGE-POSITIVE will initially provide all of the DUTYCHANGE to the lowest stage which is in the AUTO mode (unless the percentage modulation of that stage would tend to exceed a 100%), but the percentage modulation of each subsequent stage which is in the AUTO mode will, nevertheless, be increased to the excess modulation of next preceding stage over its MOD point. Should this result in a subsequent stage being modulated above its fire point, that stage would be turned on when its turn came up for processing. This could produce a sudden increase in total percentage modulation of the system. Subroutine PID would then produce a negative DUTYCHANGE, and the next time subroutine STAGE is called, STAGE-NEGATIVE would be performed. According to this subroutine, no stage is brought below its fire point until the previous stage is brought below its MOD point by having its modulation reduced by DUTYCHANGE. Hence, the overall effect of the subroutine STAGE would be to share the required heating burden among all stages that are in the AUTO mode.

Although preferred forms of the invention have been disclosed for illustrative purposes, those skilled in the art will appreciate that many additions, modifications, and substitutions are possible without departing from the scope and spirit of the invention as described in the accompanying claims.

What is claimed is:

1. A boiler system for a medium to be heated, comprising:

a plurality of boilers each having a control input for receiving a signal effective to regulate the modulation level of the boiler as a proportion of its fully turned-on condition;

means for providing a sense signal representing the temperature or pressure of the medium;

means for providing a set point signal representing the desired temperature or pressure of said medium;

means jointly responsive to said sense and setpoint signals for generating a DUTYCHANGE signal representing the amount of energy required to change the temperature of said medium to said desired temperature or pressure within a predetermined time; and means for selecting one of said boilers as the lead boiler;

sequencing means for producing a plurality of control signals, each applied to the control input of one of said boilers, said control signals being produced in a predefined sequence starting with the lead boiler's control signal when the total output of all boilers is to be increased in the reverse of said predefined sequence, when the total output of all boilers is to be decreased;

means defining for each boiler a FIRING point corresponding to the minimum modulation of the boiler when it is turned on and a MOD point corresponding to a modulation level of said boiler at which an immediately subsequent boiler is in said predefined sequence enabled to be turned on, and means for inhibiting a boiler from being brought below its firing point, before the preceding boiler is brought below its MOD point.

2. A system in accordance with claim 1, wherein said defining means comprises means for selectively adjusting at least one of the FIRING point and the MOD point for each boiler.

3. A system in accordance with claim 2, further comprising means operable to override said control means to permit a selected boiler to be turned on and off.

4. A system in accordance with claim 3, further comprising means for displaying a representation of the modulation level of each boiler.

5. A system in accordance with claim 1, further comprising means operable to override said control means to permit a selected boiler to be turned on and off.

6. A system in accordance with claim 5, further comprising means for displaying a representation of the modulation level of each boiler.

7. A system in accordance with claim 1, further comprising means for displaying a representation of the modulation level of each boiler.

8. A boiler system in accordance with claim 1 wherein said selecting means includes means for automatically changing the boiler selected as the lead boiler in a timed sequence.

9. A method for operating a boiler system for a medium to be heated, said system including a plurality of boilers each capable of being regulated in modulation level as a proportion of its fully turned-on condition, said method comprising the steps of:

generating a DUTYCHANGE signal representing the amount of energy required to change the temperature or pressure of said medium from its actual temperature or pressure to a desired temperature within a predetermined time;

selecting one of said boilers as the lead boiler;

regulating the modulation levels of the boilers in a predefined sequence starting with the lead boiler when DUTYCHANGE has a positive value;

defining for each boiler a FIRING point corresponding to the minimum modulation maintained by the boiler when it is turned on and MOD point corresponding to a modulation level of said boiler at which a subsequent boiler is enabled to be turned on;

inhibiting a boiler from being brought below its FIRING point until the preceding boiler is brought below its MOD point.

10. The method of claim 9 wherein, when DUTYCHANGE has a negative value, the modulation level of the boilers is regulated in the reverse order of said predefined sequence.

11. The method in accordance with claim 10, wherein said defining step comprises selecting a value for at least one of the FIRING point and the MOD point of each boiler.

12. The method in accordance with claim 11, further comprising the step of displaying a representation of the modulation level of each boiler.

13. The method in accordance with claim 9, wherein said defining step comprises selecting a value for at least one of the FIRING point and the MOD point of each boiler.

14. The method in accordance with claim 13, further comprising the step of displaying a representation of the modulation level of each boiler.

15. The method in accordance with claim 9, further comprising the step of displaying a representation of the modulation level of each boiler.

16. The method of claim 9 wherein said selecting step comprises periodically changing the boiler defined as the lead boiler.

17. The method of claim 9 wherein said regulating step is performed so that the boilers are operated over a substantially continuous range of modulation.

18. A control system for a boiler system for a medium to be heated, the heating system being of the type including a plurality of boilers operated in a predefined sequence, each boiler capable of being regulated in modulation level as a proportion of its fully turned-on condition, said control system comprising:

means for generating a DUTYCHANGE signal representing the amount of energy required to change the temperature in said medium from its actual value to a desired value within a predetermined time;

means for selecting one of said boilers as the lead boiler, with which said predefined sequence is started when DUTYCHANGE has a positive value, the boilers being operated in the reverse sequence when DUTYCHANGE has a negative value;

means for defining for each boiler a FIRING point corresponding to the minimum modulation maintained by the boiler when it is turned on and a MOD point corresponding to a modulation level of said boiler at which a subsequent boiler is enabled to be turned on; and means for inhibiting a boiler from being brought below its FIRING point until the preceding boiler is brought below its MOD point.

19. The control system of claim 18 further comprising means for selecting a value for at least one of the FIRING point and the MOD point of each boiler.

20. The control system of claim 18 wherein said means for selecting comprises means for automatically changing the boiler selected as the lead boiler on a timed basis.

* * * * *